US008248991B2

(12) United States Patent
Kim et al.

(10) Patent No.: US 8,248,991 B2
(45) Date of Patent: Aug. 21, 2012

(54) METHOD FOR RECEIVING BROADCAST SERVICE USING BROADCAST ZONE IDENTIFIER IN A MOBILE COMMUNICATION SYSTEM

(75) Inventors: Yu-Chul Kim, Seoul (KR); Geun-Hwi Lim, Seongnam-si (KR); Beom-Sik Bae, Suwon-si (KR); Jung-Soo Jung, Seoul (KR); Dac-Gyun Kim, Seongnam-si (KR); Yong-Chang, Seongnam-si (KR); Jung-Je Son, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 610 days.

(21) Appl. No.: 11/124,374

(22) Filed: May 9, 2005

(65) Prior Publication Data

US 2005/0249142 A1    Nov. 10, 2005

(30) Foreign Application Priority Data

May 7, 2004  (KR) .......................... 10-2004-0032412
Jun. 21, 2004  (KR) .......................... 10-2004-0046299

(51) Int. Cl.
*H04B 7/216* (2006.01)
(52) U.S. Cl. ............... 370/328; 455/414.1; 455/422.1; 455/433; 348/552; 348/553; 348/731; 348/732; 348/735; 370/313; 370/338; 370/349; 701/200; 701/213; 725/131; 725/132; 725/133; 725/140

(58) Field of Classification Search ............... 455/161.1, 455/161.2, 164.1, 164.2, 179.1, 182.1, 182.2, 455/185.1, 186.1, 414.1, 418, 419, 422.1, 455/433; 370/312, 313, 328, 338, 349; 701/200, 701/213; 725/131, 132, 133, 139, 140; 348/552, 348/553, 731, 732, 735
See application file for complete search history.

(56) References Cited

U.S. PATENT DOCUMENTS

| 5,327,574 A | * | 7/1994 | Monma et al. ................ 455/403 |
| 5,613,204 A | * | 3/1997 | Haberman et al. ......... 455/432.3 |
| 5,732,338 A | * | 3/1998 | Schwob ...................... 455/186.1 |

(Continued)

FOREIGN PATENT DOCUMENTS

CN            1467938 A       1/2004

(Continued)

*Primary Examiner* — Amancio Gonzalez
(74) *Attorney, Agent, or Firm* — Roylance, Abrams, Berdo & Goodman, LLP

(57) ABSTRACT

Disclosed is a method for providing a broadcast service in a mobile communication system including a plurality of cells. The method includes transmitting broadcast program information related to available broadcast programs, broadcast-related information needed for receiving the available broadcast programs, and broadcast zone identification information, to an access terminal; and transmitting the broadcast service to the access terminal.

13 Claims, 11 Drawing Sheets

U.S. PATENT DOCUMENTS

| | | | | |
|---|---|---|---|---|
| 6,021,433 | A * | 2/2000 | Payne et al. | 709/219 |
| 6,108,519 | A * | 8/2000 | Nitta | 340/7.27 |
| 6,167,253 | A * | 12/2000 | Farris et al. | 455/412.2 |
| 6,282,412 | B1 * | 8/2001 | Lyons | 455/186.1 |
| 6,463,265 | B1 * | 10/2002 | Cohen et al. | 455/186.1 |
| 6,483,818 | B1 * | 11/2002 | Ohno et al. | 370/328 |
| 6,766,168 | B1 * | 7/2004 | Lim | 455/435.1 |
| 6,778,808 | B1 * | 8/2004 | Shimazu | 455/3.03 |
| 6,779,019 | B1 * | 8/2004 | Mousseau et al. | 709/206 |
| 6,856,603 | B1 * | 2/2005 | Vollmer et al. | 370/311 |
| 6,912,204 | B2 | 6/2005 | Kossi et al. | 370/252 |
| 6,941,120 | B2 * | 9/2005 | Barnett et al. | 455/164.2 |
| 6,950,638 | B2 * | 9/2005 | Videtich et al. | 455/186.1 |
| 7,042,526 | B1 * | 5/2006 | Borseth | 348/731 |
| 7,203,158 | B2 * | 4/2007 | Oshima et al. | 370/208 |
| 7,305,232 | B2 * | 12/2007 | Ono et al. | 455/414.2 |
| 7,536,176 | B2 * | 5/2009 | Bae et al. | 455/414.1 |
| 2001/0022781 | A1 | 9/2001 | Makipaa | |
| 2001/0053689 | A1 * | 12/2001 | Aoki et al. | 455/414 |
| 2002/0023264 | A1 * | 2/2002 | Aaltonen et al. | 725/62 |
| 2003/0114177 | A1 | 6/2003 | Sinnarajah et al. | |
| 2003/0145092 | A1 * | 7/2003 | Funato et al. | 709/229 |
| 2004/0174927 | A1 * | 9/2004 | Cooper | 375/142 |
| 2004/0202132 | A1 * | 10/2004 | Heinonen et al. | 370/331 |
| 2004/0259495 | A1 | 12/2004 | Itoh et al. | |
| 2005/0043020 | A1 * | 2/2005 | Lipsanen et al. | 455/422.1 |

FOREIGN PATENT DOCUMENTS

| | | |
|---|---|---|
| EP | 813302 A1 * | 12/1997 |
| EP | 1045582 A1 * | 10/2000 |
| GB | 2313981 A * | 12/1997 |
| JP | 2002-171548 | 6/2002 |
| JP | 2003-174376 | 6/2003 |
| JP | 2004-7422 | 1/2004 |
| KR | 1020000035152 | 6/2000 |
| KR | 1020010030691 | 4/2001 |
| KR | 1020040027971 | 4/2004 |
| KR | 1020050087163 | 8/2005 |
| KR | 1020050098200 | 10/2005 |
| RU | 2201656 C2 | 3/2003 |
| WO | WO 03/019840 | 3/2003 |
| WO | WO 03/081816 | 10/2003 |
| WO | WO 03098871 A1 | 11/2003 |

* cited by examiner

```
DL-MAP_Message_Format() {
    Management Message Type = 2         : 8 bits
    PHY Synchronization Field           : Variable
    DCD Count                           : 8 bits
    Base Station ID                     : 48 bits
    Begin PHY Specific Section {
        for (I = 1 ; I <= n ; I++) {
            DL-MAP_IE()                 : Variable
        }
    }
    if (!byte boundary) {
        Padding Nibble                  : 4 bits
    }
}
```

FIG.3

```
DL-MAP_IE() {
    DIUC                                : 4 bits
    If (DIUC == 15) {
        Extended DIUC dependent IE      : variable
    } else {
        if (INC_CID == 1) {
            N_CID                       : 8 bits
            for (n = 0; n < N_CID; n++) {
                CID                     : 16 bits
            }
        }
        OFDMA Symbol offset             : 10 bits
        Subchannel offset               : 5 bits
        Boosting                        : 3 bits
        No. OFDMA Symbols               : 9 bits
        No. Subchannels                 : 5 bits
    }
}
```

FIG.4

| Syntax | Size |
|---|---|
| TD_Zone_IE() { | |
|   Extended DIUC | :4 bits |
|   Length | :4 bits |
|   [...] | |
|   MBS zone identifier | :8 bits |
|   Reserved | :N bits |
| } | |

FIG.5

| Syntax | Size | Note |
|---|---|---|
| MBS_Zone_IE() { | | |
|   Extended DIUC | :4 bits | |
|   Length | :4 bits | |
|   MBS zone identifier | :8 bits | |
| } | | |

FIG.6

| Syntax | Size |
|---|---|
| TD_Zone_IE() { | |
|   Extended DIUC | :4 bits |
|   Length | :4 bits |
|   [...] | |
|   N_MBS_Zone_Identifier | :8 bits |
|   for(J=1; J<N_MBS_Zone_Identifier; J++){ | |
|     MBS zone Identifier | :8 bits |
|   } | |
|   Reserved | :N bits |
| } | |

FIG.10

| Syntax | Size |
|---|---|
| TD_Zone_IE() { | |
|   Extended DIUC | :4 bits |
|   Length | :4 bits |
|   [...] | |
|   N_MBS_Zone_Identifier | :8 bits |
|   for(J=1; J<N_MBS_Zone_Identifier; J++){ | |
|     MBS zone Identifier | :8 bits |
|   } | |
|   Reserved | :N bits |
| } | |

FIG.11

METHOD FOR RECEIVING BROADCAST SERVICE USING BROADCAST ZONE IDENTIFIER IN A MOBILE COMMUNICATION SYSTEM

PRIORITY

This application claims priority under 35 U.S.C. §119(a) of an application entitled "Method for Receiving Broadcast Service Using Broadcast Zone Identifier in a Mobile Communication System" filed in the Korean Intellectual Property Office on May 7, 2004 and assigned Serial No. 2004-32412, and an application entitled "Method for Receiving Broadcast Service Using Broadcast Zone Identifier in a Mobile Communication System" filed in the Korean Intellectual Property Office on Jun. 21, 2004 and assigned Serial No. 2004-46299, the entire contents of both of which are incorporated herein by reference.

BACKGROUND OF THE INVENTION

1. Field of the Invention

The present invention relates generally to a method and apparatus for receiving a broadcast service in a wireless mobile communication system. In particular, the present invention relates to a method and apparatus for providing and receiving a broadcast service using common radio resources.

2. Description of the Related Art

The future communication environment is expected to undergo a sudden change regardless of wire/wireless zone, district, or country. Particularly, in an International Mobile Telecommunication-2000 (IMT-2000) environment which is the typical future communication environment, not only voice and image but also various information needed by a user are collectively provided in real time. The development of mobile communication systems enables a user of an access terminal (AT, also known as a mobile station) such as a cellular phone or a Personal Communication System (PCS) phone not only to transmit text information but also to view a broadcast service including high-speed image, voice and sound, beyond the basic voice communication.

In a broadcast service in the conventional mobile communication system, upon detecting the fact that a broadcast service is supported within a cell, an access terminal acquires information (for example, a connection identifier (CID) and an encryption key) used for receiving a physical channel and information (for example, a program list, a multicast Internet Protocol (IP) address, and a port number) used for receiving a broadcast, from an access point (AP, also known as a base station), before receiving the corresponding broadcast. To this end, the access terminal should acquire the same broadcast-related information no matter the cell in which the access terminal is located.

FIG. 1 is a diagram illustrating a system configuration in which all cells provide the same broadcast service. As illustrated, because all of the cells covered by their own access points provide the same broadcast service, an access terminal 10 can receive the broadcast service in all of the cells using the same program information provided from any one of the access points and its associated physical channel information.

However, assuming that different local broadcasts are provided in two different cells and broadcast reception information acquirable from one zone and its associated physical channel information are different from broadcast reception information acquirable from another zone and its associated physical channel information, when an access terminal in receiving a broadcast crosses over the boundary between the two different zones, the access terminal cannot recognize a broadcast service of the new zone.

That is, in the conventional mobile communication system, when a new zone provides a broadcast service of a different content using physical channel information that is different from that of the original zone, an access terminal receiving a particular broadcast channel continuously attempts to receive the broadcast service using its old zone's physical channel information without recognizing the fact that the broadcast service changes when it crosses over the boundary between the zones. In this case, therefore, the access terminal enters a broadcast failure state without recognizing the fact that it is in a new zone and still trying to receive the broadcast associated with the previous zone.

SUMMARY OF THE INVENTION

It is, therefore, an object of the present invention to provide a method and apparatus for informing an access terminal of the fact that when the access terminal crosses over the boundary between broadcast zones in coverage of a wireless communication system including a plurality of broadcast zones, a broadcast service provided in a new broadcast zone changes.

It is another object of the present invention to provide a method and apparatus in which an access terminal crossing over the boundary between broadcast zones in coverage of a wireless communication system comprising a plurality of broadcast zones, receives information concerning a broadcast service provided in a new broadcast zone changes.

According to one aspect of the present invention, there is provided a method for providing a broadcast service in a mobile communication system comprising a plurality of cells. The method comprising the steps of transmitting broadcast program information related to available broadcast programs, broadcast-related information needed for receiving the available broadcast programs, and broadcast zone identification information, to an access terminal; and transmitting the broadcast service to the access terminal.

According to one aspect of the present invention, there is provided a method for receiving by an access terminal a broadcast service while crossing over a boundary between a plurality of cells in a mobile communication system comprising the plurality of cells. The method comprising the steps of receiving broadcast zone identification information representing a broadcast zone to which a target cell belongs when the access terminal receiving a broadcast program in a source cell which is one of the plurality of cells, moves to the target cell; and determining whether the access terminal has departed from its old broadcast zone, based on the broadcast zone information.

BRIEF DESCRIPTION OF THE DRAWINGS

The above and other objects, features and advantages of the present invention will become more apparent from the following detailed description when taken in conjunction with the accompanying drawings in which:

FIG. 3 is a diagram illustrating a format of a downlink MAP (DL-MAP) message according to an embodiment of the present invention;

FIG. 4 is a diagram illustrating a format of the DL-MAP_IE according to an embodiment of the present invention;

FIG. 5 is a diagram illustrating a message format in the case where an Multimedia and Broadcast Service (MBS) zone identifier is included in a TD_Zone_IE of a DL-MAP message according to an embodiment of the present invention;

FIG. 6 is a diagram illustrating a message format for the case where an MBS zone identifier is included in an MBS_Zone_IE of a DL-MAP message according to an embodiment of the present invention;

FIG. 10 is a diagram illustrating a message format for the case where an MBS zone identifier list is included in a TD_Zone_IE of a DL-MAP message according to an embodiment of the present invention;

FIG. 11 is a diagram illustrating a message format for the case where an MBS zone identifier list is included in an MBS_Zone_IE of a DL-MAP message according to an embodiment of the present invention.

Throughout the drawings, the same element is designated by the same reference numeral or character.

DETAILED DESCRIPTION OF EXEMPLARY EMBODIMENTS

Several preferred embodiments of the present invention will now be described in detail with reference to the accompanying drawings. In the following description, a detailed description of known functions and configurations incorporated herein has been omitted for conciseness.

The present invention allocates a unique Multimedia and Broadcast Service (MBS) zone identifier to each broadcast zone (hereinafter referred to as a "MBS zone") in coverage of one wireless communication system comprising a plurality of MBS zones so that an access terminal in receiving a broadcast can recognize a change in MBS zone. Two embodiments of allocating unique MBS zone identifiers to different MBS zones are provided. A first embodiment allocates one MBS zone identifier for one access point or base station, and a second embodiment identifies MBS zones with a connection identifier (CID) corresponding to a broadcast program being transmitted.

Figure 1:
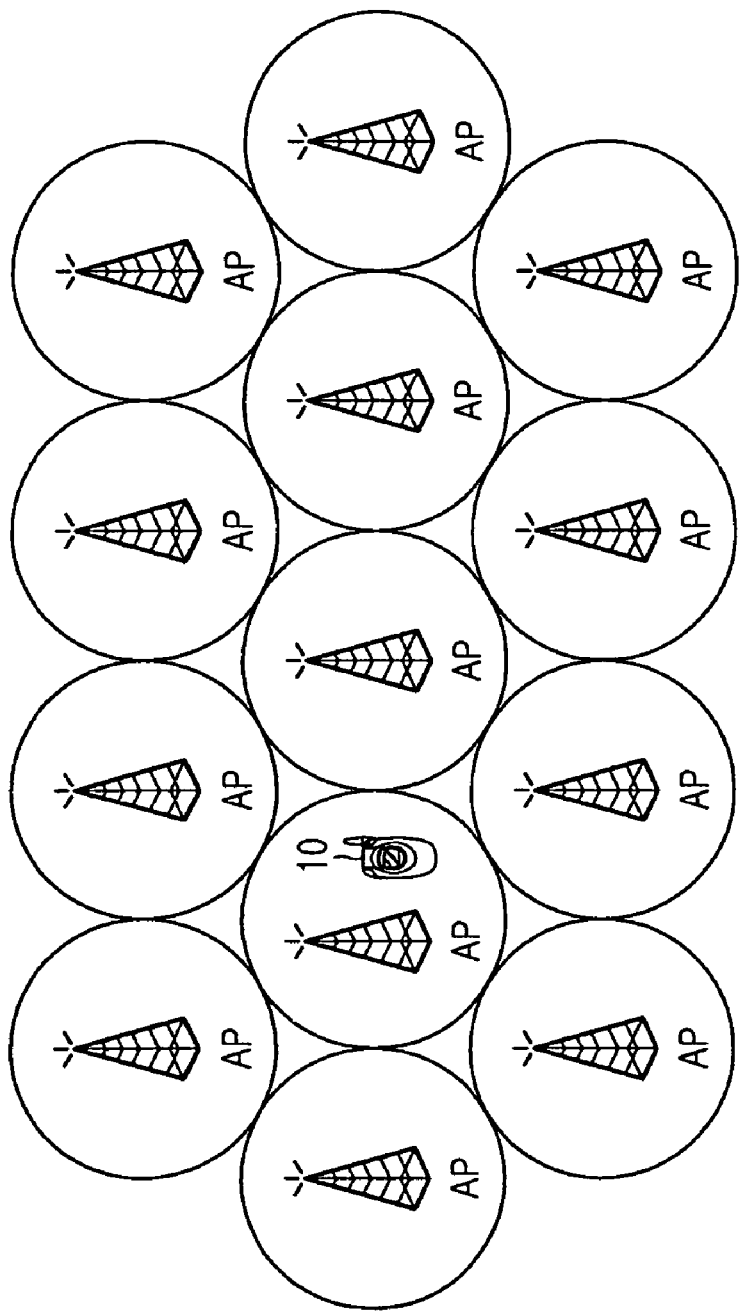
FIG. 1 is a diagram illustrating a conventional system configuration in which all cells provide the same broadcast service.
Figure 2:
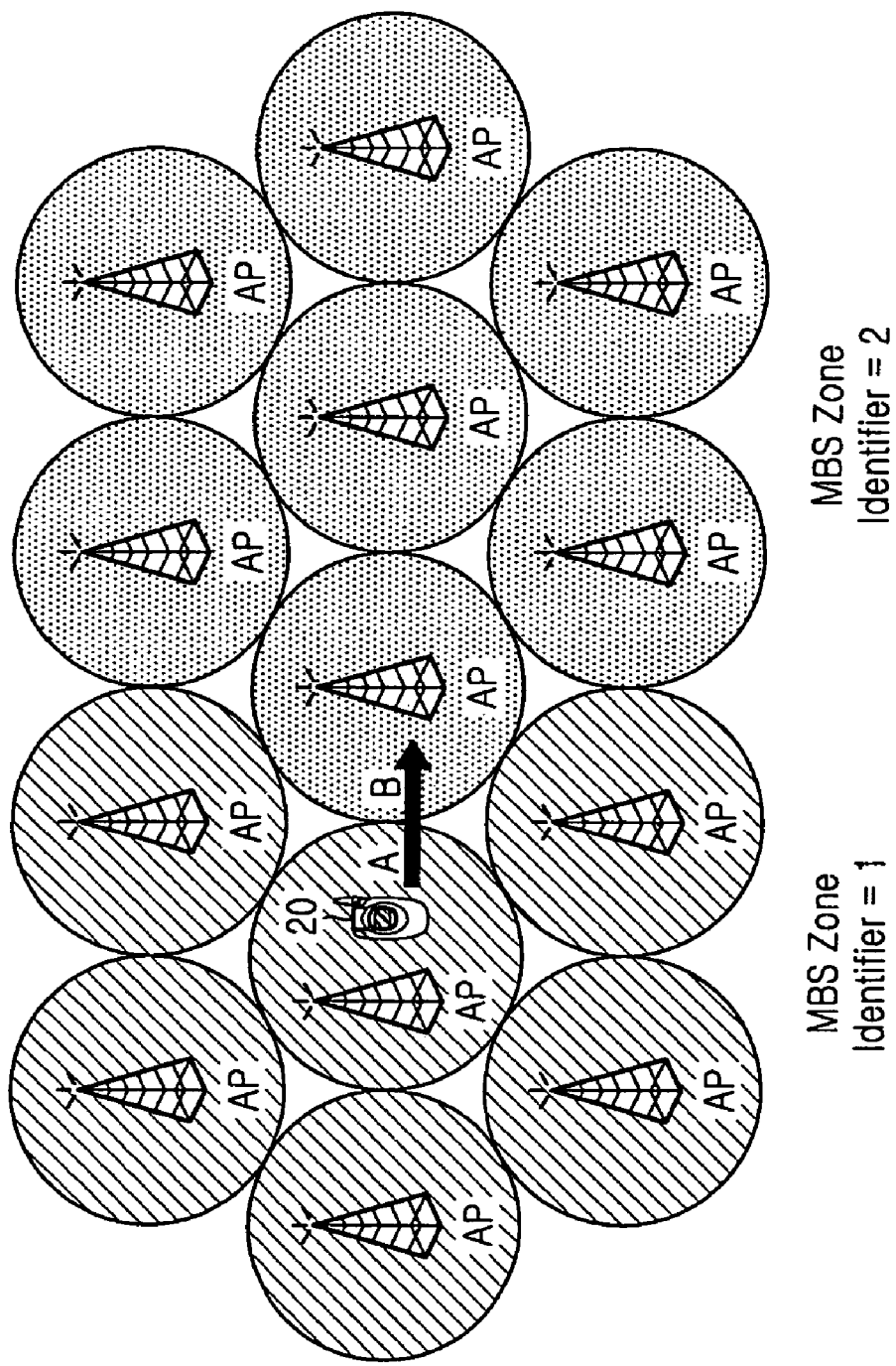
FIG. 2 is a diagram illustrating a system configuration in which cells provide different broadcast services in a mobile communication system according to an embodiment of the present invention.

FIG. 2 is a diagram illustrating a system configuration in which cells provide different broadcast services (or different MBS services) in a mobile communication system according to an embodiment of the present invention. As illustrated, cells belonging to two MBS zones denoted by different oblique lines provide different broadcast services, and the two MBS zones have an identifier #1 and an identifier #2, respectively. When an access terminal 20 moves from a cell A toward a cell B, the system informs the access terminal 20 of a change in MBS zone, and the access terminal 20, upon recognizing the change, retransmits a request for the broadcast-related information to its access point to continue to receive the broadcast.

A description will now be made of embodiments of the present invention with reference to a wireless communication system using an Institute for Electrical and Electronics Engineers (IEEE) 802.16 standard, as an example. However, the embodiments of the present invention are not restricted to the system configuration described below, and can be applied to any other systems having the similar technical background.

First Embodiment

A first embodiment of the present invention geographically divides MBS zones, and allocates one MBS zone identifier for one access point. An access terminal monitors a downlink MAP (DL-MAP) message to acquire physical channel configuration information of a cell where it is located. Because the access terminal monitors all DL-MAP messages transmitted from its access point, a system comprises a MBS zone identifier in the DL-MAP messages prior to transmission in order to identify which MBS zone the access terminal is currently located.

FIG. 3 is a diagram illustrating a format of a DL-MAP message to which the present invention is applied. As illustrated, the DL-MAP message comprises an 8-bit Management Message Type, a variable-length physical (PHY) Synchronization Field, an 8-bit Downlink Channel Descriptor (DCD) Count, a 48-bit Base Station ID, and a variable-length PHY Specific Section. The PHY Specific Section comprises n DL-MAP Information Elements (DL-MAP_IEs).

FIG. 4 is a diagram illustrating a format of the DL-MAP_IE according to an embodiment of the present invention. As illustrated, the DL-MAP_IE basically comprises a 4-bit Downlink Interval Usage Code (DIUC) indicating a type of the DL-MAP_IE. In the general case, the DL-MAP_IE comprises an 8-bit N_CID (Number of CIDs), N_CID 16-bit CIDs, a 10-bit Orthogonal Frequency Division Multiple Access (OFDMA) Symbol offset, a 5-bit Subchannel offset, a 3-bit Boosting, a 9-bit No. OFDMA Symbols (Number of OFDMA Symbols), and a 5-bit No. Subchannels (Number of Subchannels) in addition to the DIUC.

The CID, a connection identifier included in the DL-MAP_IE, represents a multicast address or a unicast address to which the DL-MPA_IE is allocated. The OFDMA Symbol offset represents a difference (or offset) between a start of a downlink frame at which a DL-MAP is transmitted and a point of an OFDMA symbol where a data burst starts. The Subchannel offset is the lowest OFDMA subchannel's index used for transmission of a data burst, and begins at '0'. The Boosting indicates whether corresponding allocated subchannels were power-boosted. The No. OFDMA Symbols represents the number of OFDMA symbols for transmission of a downlink physical channel burst. The No. Subchannels represents the number of subchannels having subsequent indexes used for transmission of a data burst.

When it is desired to add an MBS zone identifier to the DL-MAP_IE, a value of the DIUC is set to a predetermined value, e.g., 15. If the DIUC value is set to 15, an Extended DIUC dependent IE is included at the end of the IDUC. The Extended DIUC dependent IE is comprised of a TD_Zone_IE.

FIG. 5 is a diagram illustrating a message format for the case where an MBS zone identifier is included in a TD_Zone_IE of a DL-MAP message according to a first embodiment of the present invention. As illustrated, the TD_Zone_IE includes a 4-bit Extended DIUC, a 4-bit Length field, and an 8-bit MBS zone identifier. The Extended DIUC represents a DIUC of the TD_Zone_IE.

In another case, an MBS_Zone_IE, which is a dedicated field for inserting a MBS zone identifier into the Extended DIUC dependent IE, is used.

FIG. 6 is a diagram illustrating a message format for the case where a MBS zone identifier is included in an MBS_Zone_IE of a DL-MAP message according to the first embodiment of the present invention. As illustrated, the MBS_Zone_IE includes a 4-bit Extended DIUC, a 4-bit Length field, and an 8-bit MBS zone identifier. The Extended DIUC represents a DIUC of the MBS_Zone_IE.

An access terminal in receiving a broadcast service detects an MBS zone identifier from a TD_Zone_IE( ) or an MBS_Zone_IE( ) of a DL-MAP message received from the system, and compares the detected new MBS zone identifier with its old MBS zone identifier. If the received new MBS zone identifier differs from the old MBS zone identifier, the access terminal sends to an access point a request for a multicast IP address, a port number, an encryption key, a CID, and the like as broadcast-related information, recognizing that it has entered a new MBS zone. Subsequently, the access terminal receives the broadcast-related information from the access point and continues to receive the broadcast.

Figure 7:
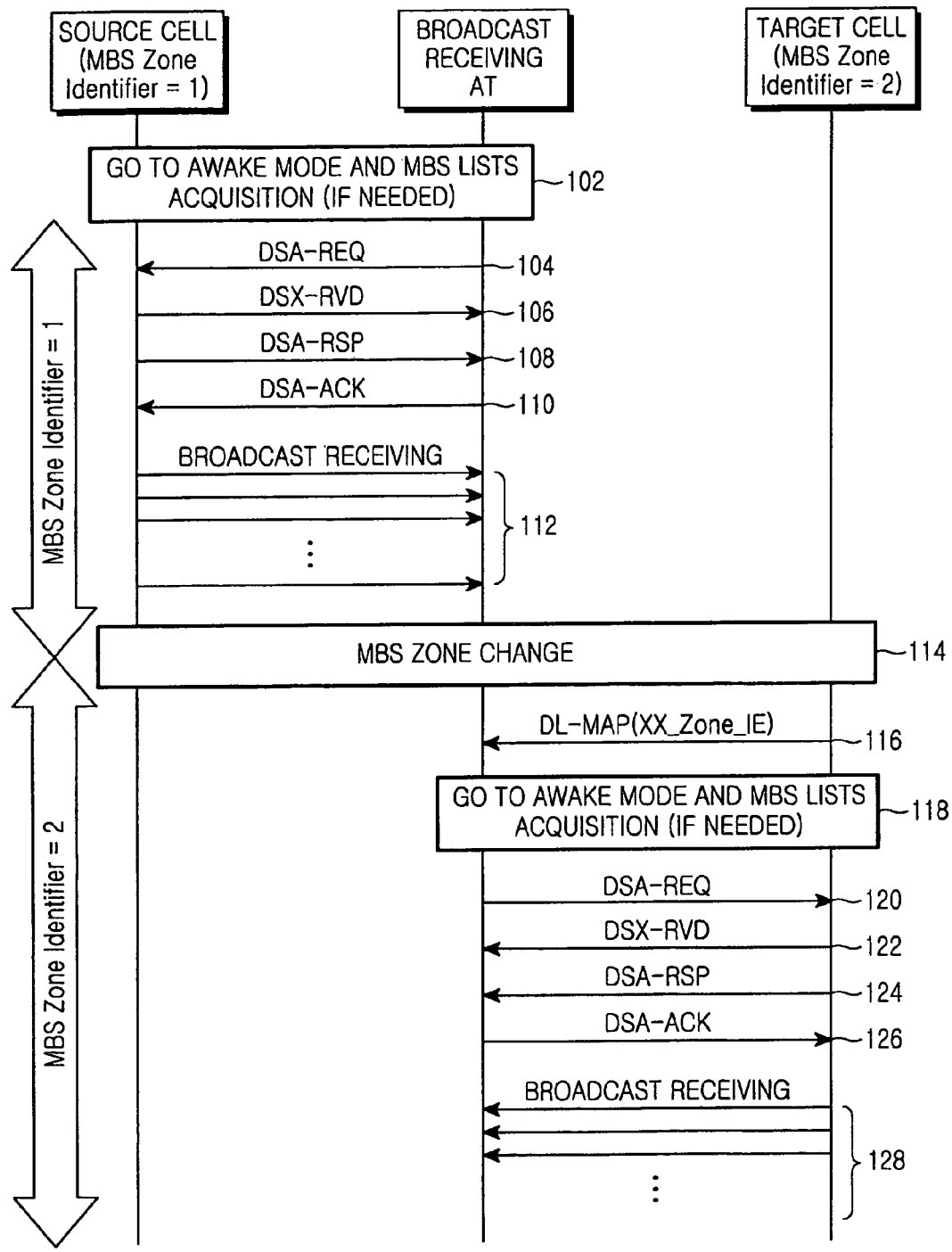
FIG. 7 is a message flow diagram illustrating a procedure for changing an MBS zone according to an embodiment of the present invention.

FIG. 7 is a message flow diagram illustrating a procedure for changing an MBS zone according to the first embodiment of the present invention. Referring to FIG. 7, an access terminal acquires related information for a broadcast program from a source cell with an MBS zone identifier=1, if needed to receive a broadcast at step 102. Herein, the related information for a broadcast program can comprise a list of broadcasts in service or available services. The access terminal sends to an access point or base station a request for such information as a CID and an encryption key, used for receiving data (image, sound, text, etc.) for the broadcast program from the source cell, through a Dynamic Service Addition Request (DSA-REQ) at step 104. At this time, the access terminal transmits a multicast IP address for the corresponding program together to the access point. The access point transmits a Dynamic Service-x Received (DSX-RVD) indicating validity of the request to the access terminal at step 106, and then transmits a Dynamic Service Addition Response (DSA-RSP), a response indicating supportability of QoS, to the access terminal at step 108. The DSA-RSP comprises such information as a CID and an encryption key used for receiving a broadcast from the source cell. Then the terminal transmits a Dynamic Service Addition Acknowledge (DSA-ACK) to the access point in response to the DSA-RSP at step 110, and receives the broadcast using the information at step 112. That is, the access terminal decodes a DL-MAP message received from the source cell, and starts receiving a physical channel having a CID of a desired program. The access terminal stores a MBS zone identifier value, i.e., '1', of the source cell, included in the DL-MAP message.

If the access terminal moves to a target cell at step 114, the access terminal receives a DL-MAP message from the target cell and detects a MBS zone identifier '2' of the target cell by analyzing a TD_Zone_IE or an MBS_Zone_IE of the DL-MAP message at step 116. Because the MBS zone identifier '2' of the target cell differs from the MBS zone identifier '1' previously stored therein, the access terminal sends a request for related information for reception of a new broadcast program to the target cell if needed, determining that it cannot continuously receive the current broadcast at step 118. The access terminal, if needed, transitions to an awake state in which it can transmit the request for the new broadcast program reception-related information. Thereafter, the access terminal transmits a DSA-REQ message to the target cell in order to inquire whether the broadcast that it was receiving in the source cell is available in the target cell at step 120. Upon receiving a DSX_RVD from the target cell at step 122 and then receiving a DSA_RSP comprising new broadcast reception-related information from the target cell at step 124, the access terminal transmits a DSA_ACK in response to the DSX_RVD and the DSA_RSP at step 126 and receives a broadcast service from the target cell at step 128. Then the access terminal stores the MBS zone identifier '2'. If the broadcast that the access terminal was receiving in the source cell is unavailable in the target cell, the access terminal acquires an available-program list from the target cell and starts reception of a new broadcast program.

Figure 8:
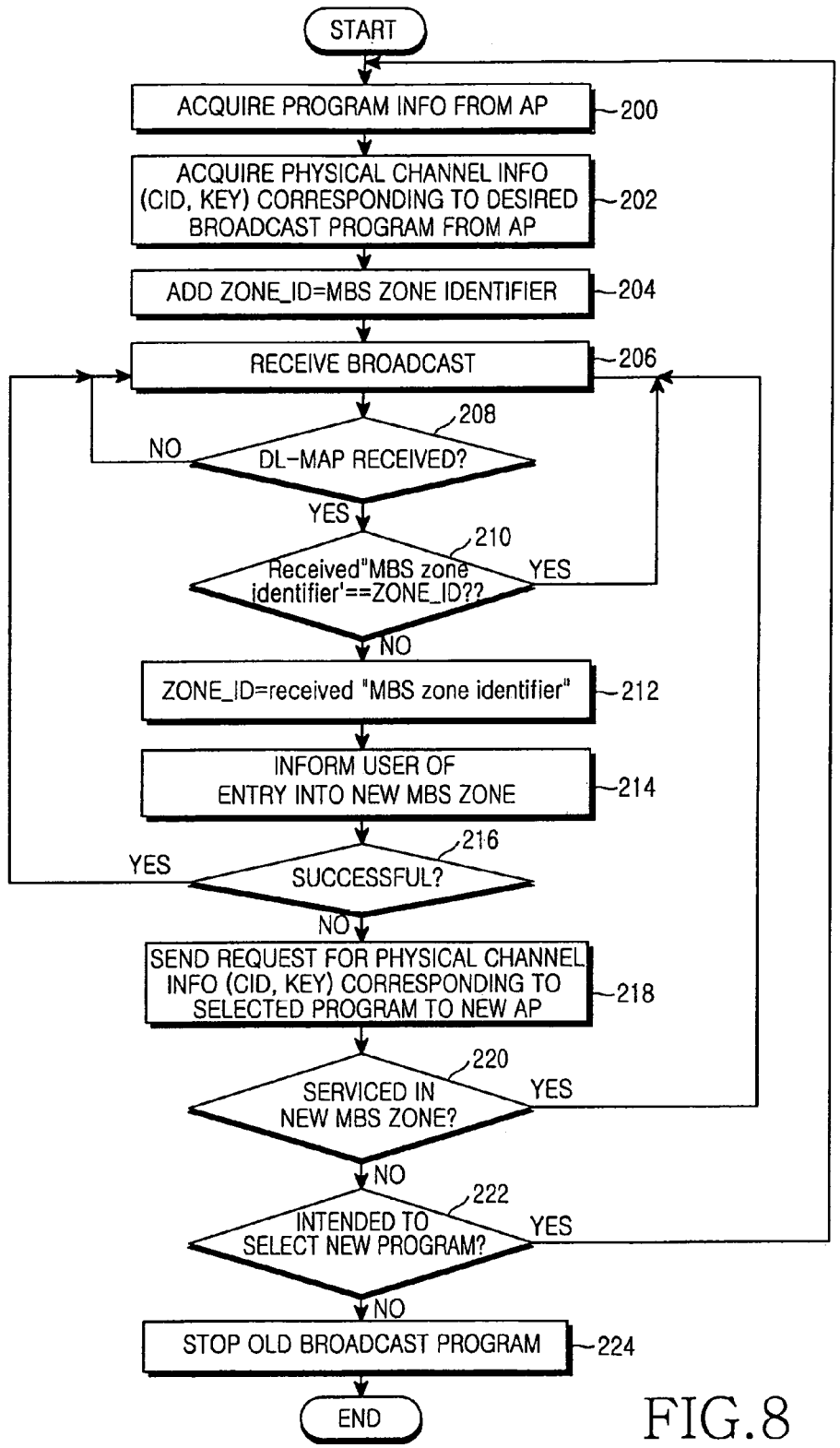
FIG. 8 is a flowchart illustrating an operation of an access terminal according to an embodiment of the present invention.

FIG. 8 is a flowchart illustrating an operation of an access terminal according to the first embodiment of the present invention. Referring to FIG. 8, the access terminal acquires program information from an access point of a source cell in step 200, and acquires physical channel information (CID and encryption key) corresponding to a broadcast program selected by a user and an MBS zone identifier from the access point or base station in step 202. The access terminal stores an MBS zone identifier for its current zone in step 204, and receives a broadcast service from the source cell using the physical channel information in step 206.

If a DL-MAP message is received from an access point of a target cell in step 208, the access terminal determines in step 210 whether an MBS zone identifier included in the received DL-MAP message is equal to the MBS zone identifier stored therein. If the MBS zone identifiers are equal to each other, the access terminal returns to step 206 to continuously receive the broadcast service. However, if the MBS zone identifiers are not equal to each other, the access terminal proceeds to step 212 where it re-stores the received MBS zone identifier. In step 214, the access terminal informs the user of his/her departure from the old MBS zone corresponding to the old broadcast program. The departure information can be provided to the user with a liquid crystal display (LCD) panel, a speaker, or a vibrator. In step 216, the access terminal attempts to receive the broadcast program in the target cell using the physical channel information that it was using in the source cell. The process of step 216 is optional. That is, in a system that transmits a broadcast program in the same method even when a cell is changed for the same broadcast service, the process of step 216 is performed. Otherwise, the process of step 216 can be skipped. Herein, it is assumed that the process of step 216 is performed.

Upon failure to receive the broadcast program, the access terminal transmits in step 218 a request for physical channel information for the broadcast program that it is continuously receiving from the source cell, to an access point of the target cell. In step 220, the access terminal determines whether information indicating availability of the broadcast program in the target cell and physical channel information for the broadcast program have been received from the target cell in response to the physical channel information request. If the information has been received, the access terminal returns to step 206 where it continuously receives the broadcast program using the physical channel information for the broadcast program, included in the response message.

However, if the information indicating availability of the broadcast program in the target cell and the physical channel information for the broadcast program have not been received, the access terminal inquires of the user whether he/she will receive a new broadcast program in step 222. This inquiry can be made by displaying a text message or an icon on the LCD panel. If the user desires to receive a new broadcast program, i.e., if a request signal for a new broadcast service is input, the access terminal transmits a request for required information on the broadcast program to the access point of the target cell. Thereafter, the access terminal returns to step 200 to receive a new broadcast program from the target cell by acquiring information on the new broadcast program selected by the user. If the user does not desire to receive a new broadcast program, the access terminal stops the old broadcast program in step 224.

Second Embodiment

A second embodiment of the present invention identifies MBS zones with a CID. A broadcast program transmitted from an access point has its own unique CID. Therefore, the second embodiment forms one MBS zone with the cells that transmit programs having the same CID. Thus, a cell that transmits a plurality of programs has a plurality of MBS zone identifiers.

Figure 9:
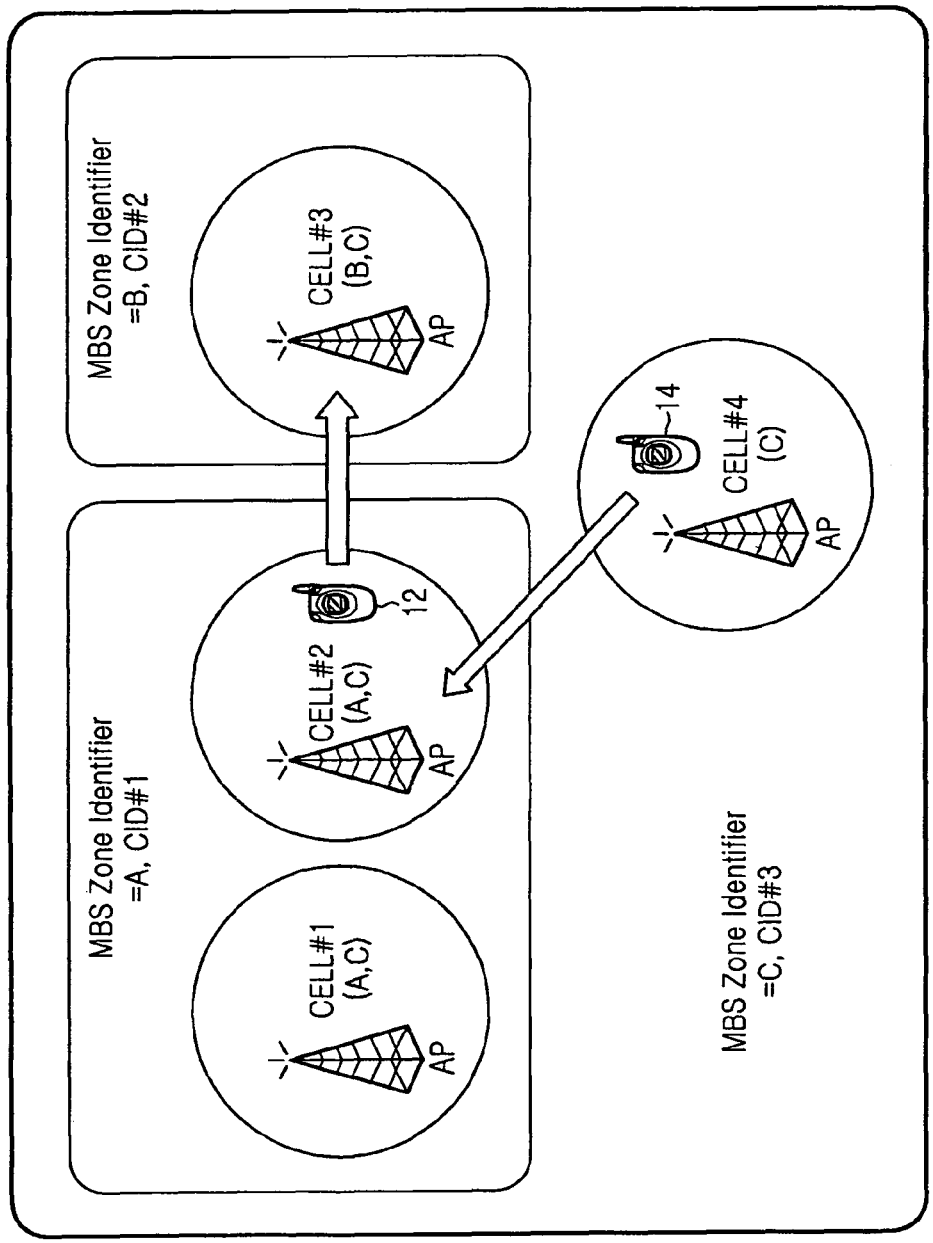
FIG. 9 is a diagram illustrating a configuration of cells having a plurality of MBS zone identifiers according to an embodiment of the present invention.

FIG. 9 is a diagram illustrating a configuration of cells having a plurality of MBS zone identifiers according to a second embodiment of the present invention. As illustrated, there are 3 MBS zones A, B and C. The MBS zones transmit programs having different CIDs of CID#1, CID#2 and CID#3, and include 4 cells. A cell#1 belongs to 2 MBS zones A and C because it transmits programs with the CID#1 and the CID#3. A cell#4 belongs to only one MBS zone C because it transmits only the program with the CID#3.

Each of the cells transmits a MBS zone identifier list indicating at least one of its own MBS zones through a DL-MAP message. An access terminal in each of the cell acquires the MBS zone identifier list by analyzing the DL-MAP message. The DL-MAP message comprises the MBS zone identifier list in a TD_Zone_IE or an MBS_Zone_IE.

FIG. 10 is a diagram illustrating a message format for the case where a MBS zone identifier list is included in a TD_Zone_IE of a DL-MAP message according to the second embodiment of the present invention. As illustrated, the TD_Zone_IE comprises a 4-bit Extended DIUC, a 4-bit Length field, an 8-bit N_MBS_Zone_identifier indicating the number of MBS zone identifiers, and a MBS zone identifier for identifying the current zone. The Extended DIUC represents a DIUC of the TD_Zone_IE.

FIG. 11 is a diagram illustrating a message format for the case where a MBS zone identifier list is included in an MBS_Zone_IE of a DL-MAP message according to the second embodiment of the present invention. As illustrated, the MBS_Zone_IE comprises a 4-bit Extended DIUC, a 4-bit Length field, and a plurality of MBS zone identifiers. The number of the MBS zone identifiers can be determined by the Length field. The Extended DIUC represents a DIUC of the MBS_Zone_IE.

An access terminal in receiving a broadcast service detects an MBS zone identifier list from a TD_Zone_IE( ) or an MBS_Zone_IE ( ) of a DL-MAP message received from the system, and compares the detected MBS zone identifier list with its old MBS zone identifier. If the old MBS zone identifier is not included in the MBS zone identifier list, the access terminal can send to an access point a request for a multicast IP address, a port number, an encryption key, a CID, and the like as broadcast-related information, recognizing that it has entered a new MBS zone. Subsequently, the access terminal receives the broadcast-related information from the access point and continues to receive the broadcast.

As described above, an access point identifies which MBS zone the current cell belongs to, using a DL-MAP message. Mapping information for MBS zones mapped to CIDs is transmitted through a DSA-RSP message rather than the DL-MAP message. If an access terminal transmits a DSA-REQ message for requesting a desired broadcast program to an access point, the access point provides the access terminal with a CID of the requested broadcast program and mapping information of an MBS zone mapped to the CID using a DSA-RSP message in response to the DSA-REQ message. MBS zone identifier information in the DSA-RSP message is configured as illustrated in Table 1.

TABLE 1

| Type | Length | Value | Scope |
|---|---|---|---|
| [145/146].29 | 8 | MBS Zone Identifier | DSA-RSP |

The access terminal manages its own MBS zone identifier list MY_ZONE_ID_LIST in which it is registered, and the total MBS zone identifier list ZONE_ID_LIST. The MY_ZONE_ID_LIST comprises at least one MBS zone identifier corresponding to a CID that the access terminal is currently receiving. The ZONE_ID_LIST comprises all MBS zone identifiers to which the current cell belongs, i.e., all MBS zone identifiers acquired from the DL-MAP message. Management of the lists will be described below.

First, a description will be made of the case where an access terminal departs from a MBS zone to which the access terminal belongs. An MBS zone identifier corresponding to a CID that an access terminal was receiving is not included in an MBS zone identifier list received from a new cell, the access terminal deletes the its old MBS zone identifier from the MY_ZONE_ID_LIST and the ZONE_ID_LIST. In this case, the access terminal transmits a DSA-REQ message to an access point of the new cell and then determines whether a broadcast program corresponding to the CID that it was receiving is received through another physical channel. If the broadcast program is received through another physical channel, the access terminal adds a corresponding MBS zone identifier of the new cell to the MY_ZONE_ID_LIST and then continuously receives the broadcast program. However, if the broadcast program is not transmitted, the access terminal receives broadcast program-related information from the access point of the new cell and informs the user of available new programs.

Next, a description will be made of the case where an access terminal has departed from its own MBS zone but the MY_ZONE_ID_LIST is included in the MBS zone identifier list received from the access point of the new cell. That is, if the access terminal has departed from a MBS zone that transmits the currently received program but the currently received program is equal to a program broadcasted from the target cell, the access terminal receives a ZONE_ID_LIST from the target cell and updates the received ZONE_ID_LIST to an MBS zone identifier list and continuously receives the old broadcast that it was receiving. The access terminal can transmit a DSA-REQ message or another request message to acquire other information related to the broadcast.

When an access terminal has entered a new MBS zone, the access terminal accesses an access point of a new cell at the request of the user and receives information related to the broadcast program serviced in the corresponding MBS zone, and informs the user of available broadcast programs according to the broadcast program information. If the user desires to receive the broadcast program, the access terminal starts receiving the new broadcast program.

The foregoing description will be made with reference to FIG. 9. An access terminal 12 is receiving a broadcast with a CID#3 in a cell#2. In the cell#2, the access terminal 12 belongs to a MBS zone C and a DL-MAP message of the cell#2 comprises a MBS zone identifier list {A,C}. If the access terminal 12 moves to a cell#3, the access terminal 12 receives a DL-MAP message comprising a MBS zone identifier list {B,C} in the cell#3. In this case, because the cell#3 still belongs to the MBS zone C, the access terminal 12 continuously receives a broadcast with a CID#3 without transmitting a request for new broadcast-related information. At the request of the user, the access terminal 12 transmits a request for broadcast program-related information to the cell#3 in the MBS zone C and attempts to receive a new broadcast program.

As another example, assume that the access terminal 12 that was receiving a broadcast with a CID#1 in the cell#2 moves to the cell#3. In this case, the access terminal 12 recognizes that it can no longer receive the broadcast with the CID#1 in the cell#3 by analyzing a MBS zone identifier list {B,C} of the cell#3, and stops receiving the broadcast with the CID#1. In another case, the access terminal 12 transmits a DSA-REQ message to an access point of the cell#3 in order to determine whether it can continuously receive its old broadcast program with another CID. As a result of analyzing a DSA-RSP message received in response to the DSA-REQ message, if it is determined that the cell#3 is providing the old broadcast program, the access terminal 12 updates its MY_ZONE_ID_LIST and continuously receives the broadcast program from the cell#3. However, if the cell#3 is not providing the broadcast program, the access terminal 12 transmits a request for broadcast program-related information to an access point of the cell#3 at the request of the user in order to acquire an available new broadcast program.

Another example, assumes that an access terminal 14 that was receiving a broadcast with a CID#3 in the cell#4 in the MBS zone C moves to the cell#2 in the MBS zone A. In this case, because the access terminal 14 moves to the new MBS zone A, it sends a request for related information for receiving a broadcast program to the cell#2. If the user desires to do so, the access terminal 14 continuously receives its old broadcast program with the CID#3.

Figure 12A:
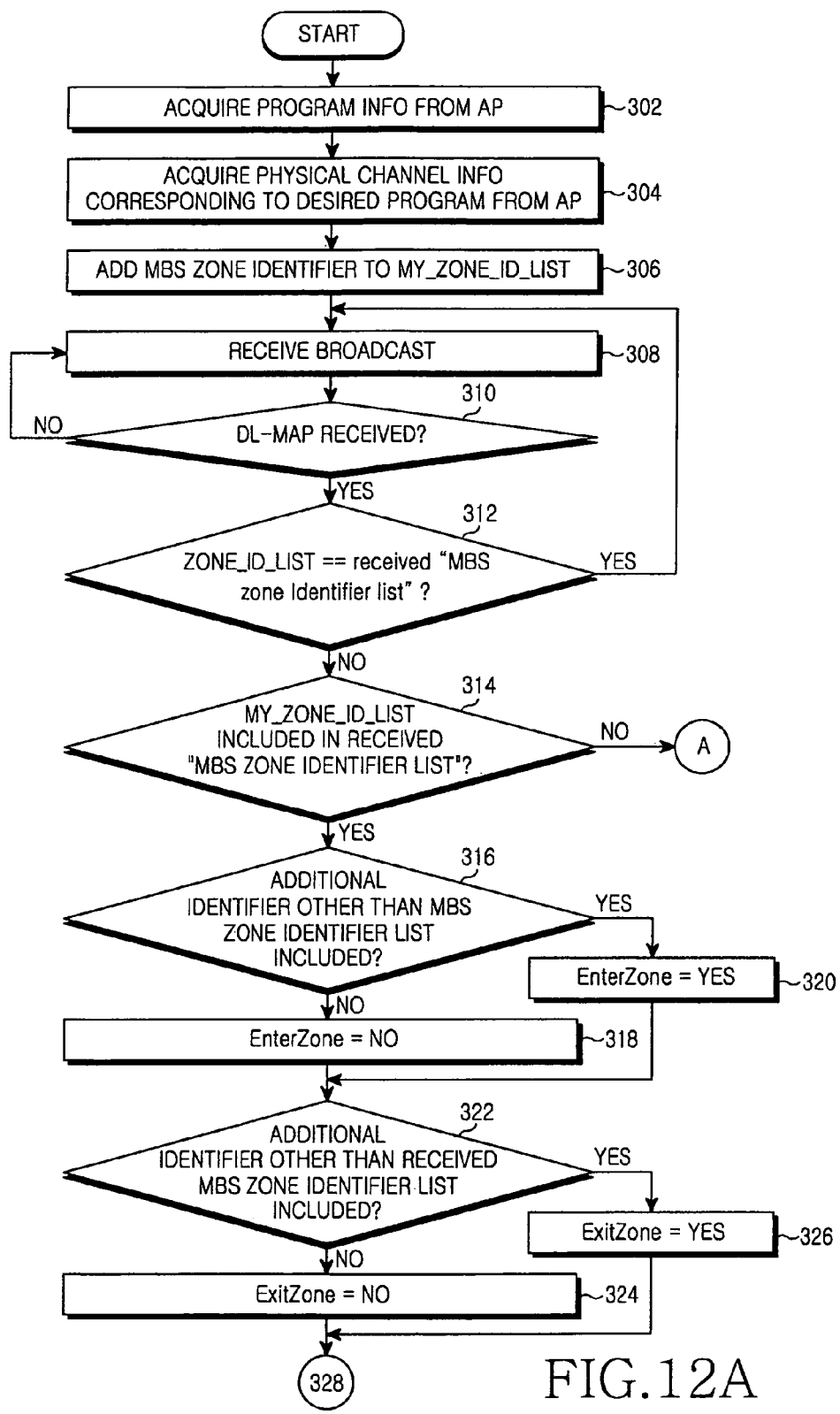
FIGS. 12A to 12C are flowcharts illustrating an MBS zone change operation of an access terminal according to an embodiment of the present invention.
Figure 12B:
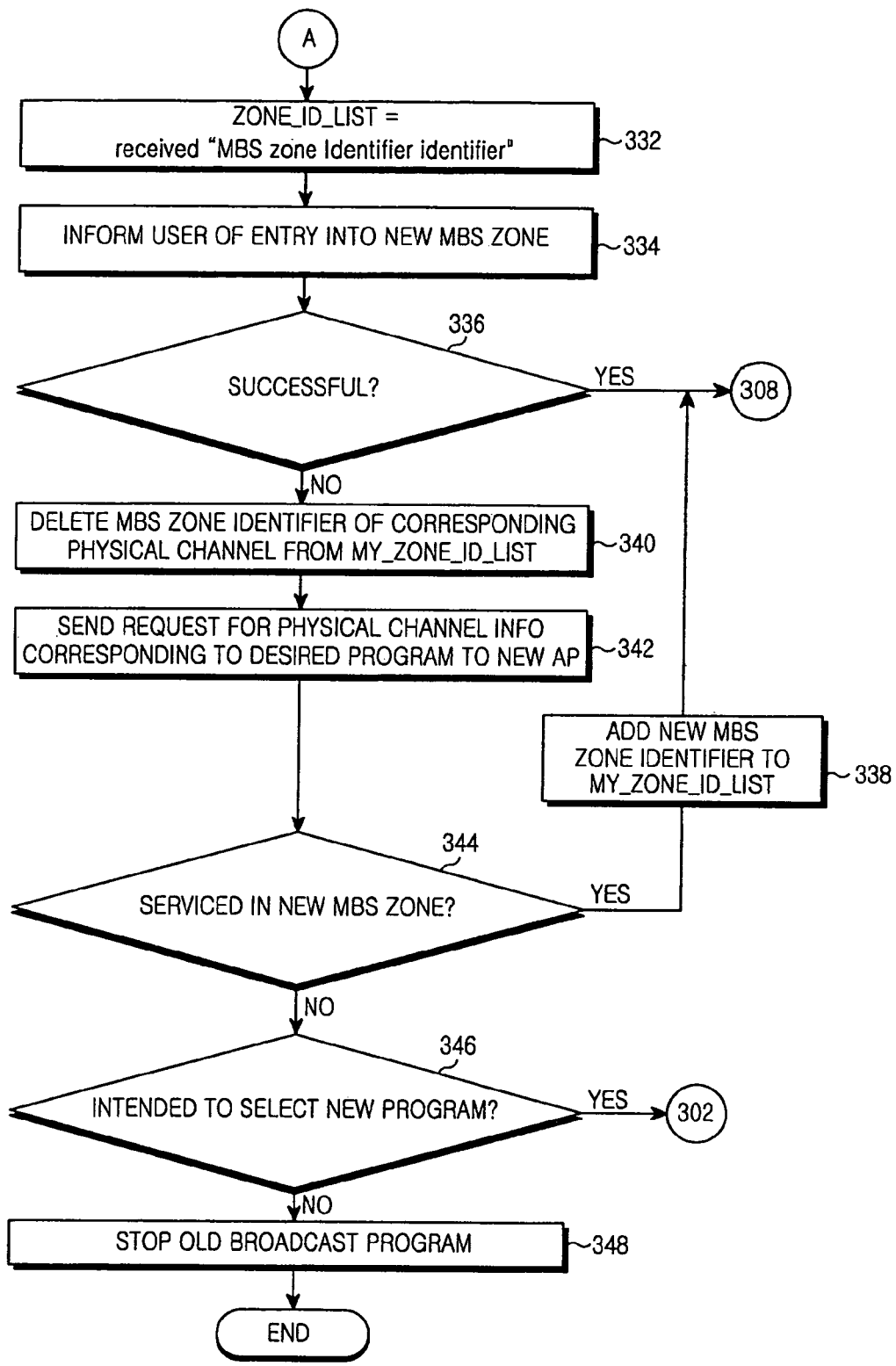
Figure 12C:
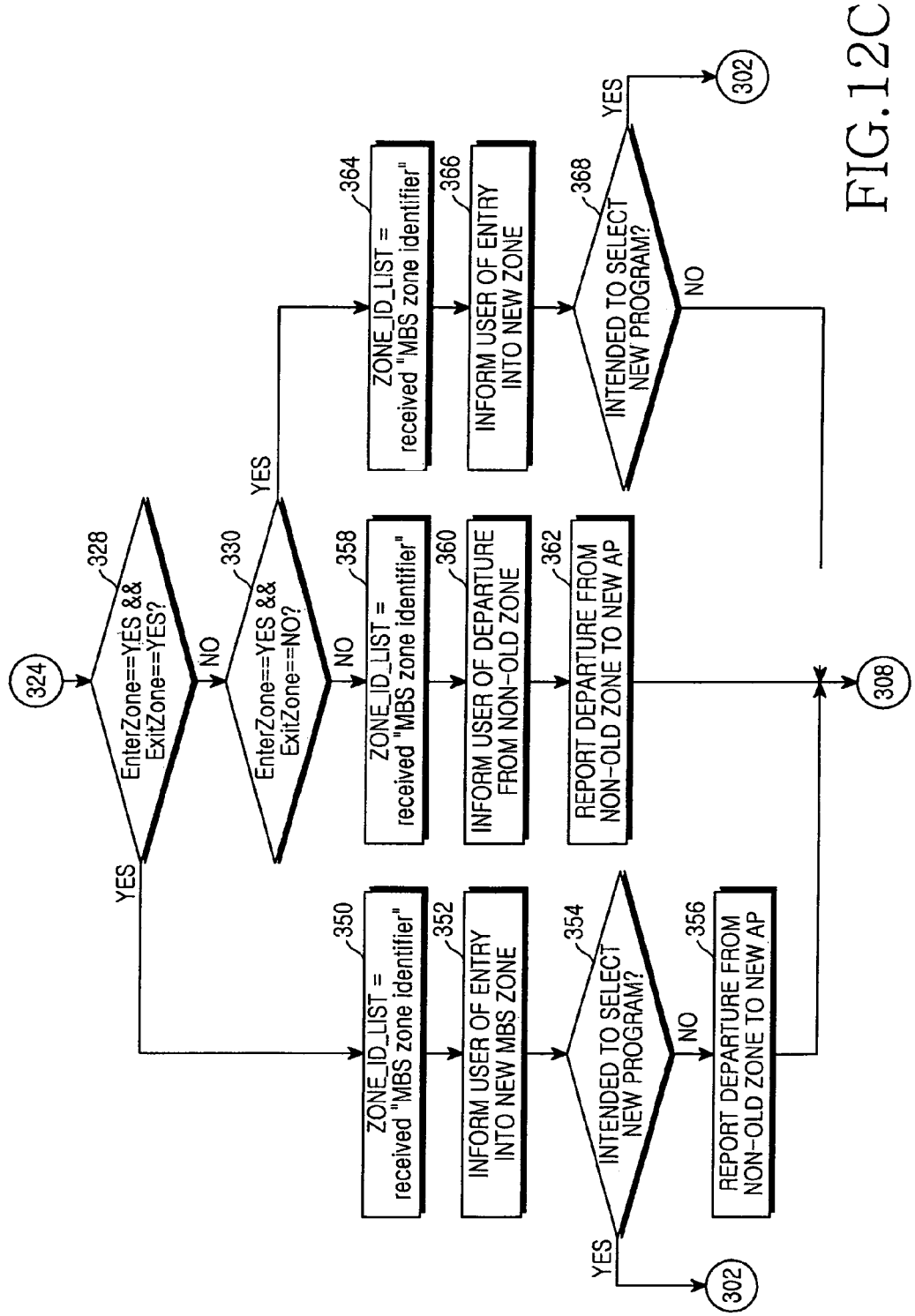

FIGS. 12A to 12C are flowcharts illustrating a MBS zone change operation of an access terminal according to the second embodiment of the present invention.

Referring to FIG. 12A, the access terminal acquires broadcast program information from an access point or a base station of a source cell in step 302, and acquires physical channel information (CID and encryption key) corresponding to a broadcast program selected by a user and an MBS zone identifier from the access point on a request basis in step 304. The access terminal adds the MBS zone identifier to its MY_ZONE_ID_LIST in step 306, and receives the broadcast using the physical channel information in step 308. A ZONE_ID_LIST of the access terminal includes MBS zone identifiers mapped to all MBS zones to which the source cell belongs.

As the access terminal moves from the source cell to a neighboring target cell, if a DL-MAP message is received from an access point of the target cell in step 310, the access terminal determines in step 312 whether an MBS zone identifier list included in the received DL-MAP message is equal to the ZONE_ID_LIST. If they are equal to each other, the access terminal returns to step 308 to continuously receive the broadcast. However, if they are not equal to each other, the access terminal proceeds to step 314 to determine whether it has entered a new MBS zone or it has simply departed from the old MBS zone.

In step 314, the access terminal determines whether the MY_ZONE_ID_LIST is included in the received MBS zone identifier list. If the MY_ZONE_ID_LIST is not included in the received MBS zone identifier list, the access terminal proceeds to step 332 of FIG. 12B, determining that it has departed from the MBS zone corresponding to its old broadcast program.

Referring to FIG. 12B, the access terminal updates the ZONE_ID_LIST to the received MBS zone identifier list in step 332, and informs the user of the departure from the old MBS zone in step 334. Optionally, the process of step 334 can be performed between the following steps 336 and 340, or between the following steps 344 and 346. In step 336, the access terminal attempts to receive the broadcast program from the target cell using the old physical channel information used in the source cell, and determines whether it has successfully received the broadcast program from the target cell. If the access terminal has successfully received the broadcast program from the target cell, the access terminal returns to step 308 to continuously receive the broadcast program. However, if the access terminal fails to receive the broadcast program, the access terminal proceeds to step 340.

The access terminal deletes an MBS zone identifier of an MBS zone corresponding to an unavailable physical channel from the MY_ZONE_ID_LIST in step 340, and transmits a request for physical channel information used for receiving the old broadcast program to the access point of the target cell in step 342. The access terminal determines in step 344 whether information indicating availability of the old broadcast program is received from the access point of the target cell in response to the request. If the old broadcast program is available in the target cell, the physical channel information used for receiving the old broadcast program is received together from the target cell. If the broadcast program is available in the target cell, the access terminal returns to step 308 to continuously receive the old broadcast program using the physical channel information from the target cell.

If it is determined in step 344 that the old broadcast program is unavailable in the target cell, the access terminal acquires, in step 346, of the user whether he/she will receive a new broadcast program. If the user desires to receive a new broadcast program, the access terminal returns to step 302 to acquire broadcast program information and physical channel information from the access point of the target cell and receive the new broadcast program. Otherwise, the access terminal stops the old broadcast program in step 348.

However, if it is determined in step 314 that the MY_ZONE_ID_LIST is included in the received MBS zone identifier list, the access terminal proceeds to step 316, determining that it has not departed from its old belonging MBS zone but there is a possibility that the access terminal will enter a new MBS zone or depart from its old non-belonging MBS zone. Herein, the term "old belongingMBS zone" refers to an MBS zone corresponding to a broadcast program that the access terminal is receiving, and the term "old non-belonging MBS zone" refers to an MBS zone corresponding to a broadcast program that the access terminal is not receiving but can be provided in the source cell.

In step 316, the access terminal determines whether the received MBS zone identifier list further comprises an MBS zone identifier in addition to the ZONE_ID_LIST. If the received MBS zone identifier list further comprises an MBS zone identifier in addition to the ZONE_ID_LIST, the access terminal sets an EnterZone indicating an entry into a new MBS zone to YES in step 320. Otherwise, the access terminal sets the EnterZone to NO in step 318. The EnterZone can be implemented as a flag in a memory included in the access terminal. In step 322, the access terminal determines whether the ZONE_ID_LIST further comprises an MBS zone identifier in addition to the received MBS zone identifier list. If the ZONE_ID_LIST further comprises an MBS zone identifier in addition to the received MBS zone identifier list, the access terminal sets an ExitZone indicating a departure from its old non-belonging MBS zone to NO in step 326. Otherwise, the access terminal sets the ExitZone to YES in step 324. Also, the ExitZone can be implemented as a flag in a memory included in the access terminal. The EnterZone and the ExitZone are determined in step 12C.

In step 328 of FIG. 12C, if both the EnterZone and the ExitZone are YES, the access terminal proceeds to step 350, determining that it departs from its old non-belonging MBS zone and enters a new MBS zone. However, if the EnterZone is YES and the ExitZone is NO in step 330, the access terminal proceeds to step 364, determining that it enters a new MBS zone. In the other cases, the access terminal proceeds to step 358, determining that it has not entered a new MBS zone but has departed from its old non-belonging MBS zone.

The access terminal updates its ZONE_ID_LIST to the received MBS zone identifier list in step 350, and informs the user of an entry into a new MBS zone providing a new broadcast in step 352. In step 354, the access terminal inquires of the user whether the user will receive an available new broadcast program in the new MBS zone. If the user desires to receive the new broadcast program, the access terminal returns to step 302. If the user does not desire to receive the new broadcast program, the access terminal returns to step 308. Before returning to the process of step 308, the access terminal can report the departure from its old non-belonging MBS zone to the access point of the target cell in step 356.

In step 358, the access terminal updates its ZONE_ID_LIST to the received MBS zone identifier list. In step 360, the access terminal informs the user of the departure from its old non-belonging MBS zone, and then returns to step 308. Before returning to the process of step 308, the access terminal can report the departure from its old non-belonging MBS zone to the access point of the target cell in step 362.

The access terminal updates its ZONE_ID_LIST to the received MBS zone identifier list in step 364, and informs the user of the entry into the new MBS zone in step 366. In step 368, the access terminal inquires of the user whether he/she will receive an available new broadcast program in the new MBS zone. If the user desires to receive the new broadcast program, the access terminal returns to step 302. If the user does not desire to receive the new broadcast program, the access terminal returns to step 308 to continuously receive the old broadcast program.

As can be understood from the foregoing description, the wireless mobile communication system providing a broadcast service (or MBS service) transmits at least one MBS zone identifier indicating a broadcast service available in a zone where an access terminal is located, to the access terminal using a DL-MAP message. Therefore, the access terminal recognizes whether it can continuously receive its old broadcast service while crossing over the boundary between MBS zones providing different broadcast services, and can send a request for related information for a new broadcast service if needed. In this manner, the present invention prevents the access terminal crossing over the boundary between MBS zones from failing to receive the broadcast service without recognizing the fact, thereby improving user satisfaction.

While the invention has been shown and described with reference to certain embodiments thereof, it will be understood by those skilled in the art that various changes in form and details may be made therein without departing from the spirit and scope of the invention as defined by the appended claims.

What is claimed is:

1. A method for providing a broadcast service in a mobile communication system including a plurality of base stations (BSs), the method comprising the steps of:
   transmitting a broadcast zone identifier allocated to uniquely identify a broadcast zone in which a same broadcast service is provided by at least one BS to an access terminal to enable an access terminal to recognize a change in broadcast zone;
   upon receiving, from the access terminal detecting a change in broadcast zone based on the broadcast zone identifier, a request for physical channel information and broadcast program information associated with a broadcast service corresponding to the broadcast zone identifier, transmitting the physical channel information and the broadcast program information to the access terminal; and
   transmitting the broadcast service corresponding to the broadcast zone identifier to the access terminal;
   wherein the at least one BS has a plurality of broadcast zone identifiers corresponding to a plurality of broadcast zones and the broadcast zone is associated with a connection identifier (CID) for the broadcast service.

2. The method of claim 1,
   wherein the physical channel information comprises at least one of a multicast Internet protocol (IP) address, a port number, an encryption key, and a connection identifier.

3. A method for receiving by an access terminal a broadcast service while crossing over a boundary between a plurality of base stations (BSs) in a mobile communication system including the plurality of BSs, the method comprising the steps of:
   receiving from a BS a broadcast zone identifier allocated to uniquely identify a broadcast zone in which a same broadcast service is provided by at least one BS including the BS;
   detecting whether the access terminal has departed from a previous broadcast zone by comparing received broadcast zone identifier with a previously stored broadcast zone identifier;
   transmitting a request for physical channel information and broadcast program information associated with a broadcast service corresponding to the broadcast zone identifier to the BS when the access terminal is detected to have departed from the previous broadcast zone; and
   receiving the broadcast service using the physical channel information and the broadcast program information received from the BS;
   wherein the at least one BS has a plurality of broadcast zone identifiers corresponding to a plurality of broadcast zones and the broadcast zone is associated with a connection identifier (CID) for the broadcast service.

4. The method of claim 3, further comprising the step of, if the access terminal is detected to have departed from the previous broadcast zone, informing a user of the departure from the previous broadcast zone.

5. The method of claim 3, further comprising the step of continuously receiving a broadcast program which the access terminal has been previously receiving using the received broadcast program information if the previously stored broadcast zone identifier is identical to the received broadcast zone identifier.

6. The method of claim 3, further comprising the steps of:
   if it is determined from the received broadcast program information that a broadcast program which the access terminal has been previously receiving is unavailable, inquiring of a user whether he/she will select a new broadcast program;

if the new broadcast program is not selected by the user, stopping the broadcast program; and if the new broadcast program is selected by the user, acquiring physical channel information for the new broadcast program from the BS on a request basis, and receiving the new broadcast program using the acquired physical channel information.

7. The method of claim 3, further comprising the step of, when the access terminal is detected to have departed from the previous broadcast zone, attempting to receive a broadcast program of the broadcast service from the BS using physical channel information that was previously used.

8. A method for receiving by an access terminal a broadcast service while crossing over a boundary between a plurality of base stations (BSs) in a mobile communication system including the plurality of BSs, the method comprising the steps of:

receiving from a base station a broadcast zone identifier list consisting of broadcast zone identifiers each allocated to uniquely identify a broadcast zone in which a same broadcast program is provided by at least one base station including the base station;

detecting whether the access terminal has departed from a previous broadcast zone by comparing received broadcast zone identifier list with a previously stored broadcast zone identifier list;

when the access terminal is detected to have departed from the previous broadcast zone and have entered a new broadcast zone, transmitting a request for physical channel information and broadcast program information associated with a new broadcasting service corresponding to the new broadcast zone to the base station; and receiving the new broadcast service using the physical channel information and the broadcast program information received from the base station;

wherein the broadcast zone is associated with a connection identifier (CID) for the broadcast service.

9. The method of claim 8, wherein the broadcast zone identifier list comprising broadcast zone identifiers each mapped to a broadcast program available from the base station.

10. The method of claim 8, wherein the step of determining whether the access terminal has departed from its previous broadcast zone comprises the steps of:

receiving a first broadcast zone identifier list comprising a broadcast zone identifier mapped to a broadcast program provided from a previous base station from which the access terminal received the previously stored broadcast zone identifier list, and a second broadcast zone identifier list comprising broadcast zone identifiers mapped to all broadcast programs provided by the previous base station; and detecting the departure from the previous broadcast zone if a third broadcast zone identifier list comprising all broadcast zone identifiers received from base station differs from the second broadcast zone identifier list and the third broadcast zone identifier list does not comprise the first broadcast zone identifier list.

11. The method of claim 10, wherein the step of transmitting the request for the physical channel information and the broadcast program information associated with the new broadcasting service and the step of receiving the new broadcast service collectively comprise the steps of:

if the access terminal departs from the previous broadcast zone, updating the second broadcast zone identifier list to the third broadcast zone identifier list, and attempting to receive the broadcast program via the new broadcast service from the base station using physical channel information from the previous base station;

if the access terminal succeeds in receiving the broadcast program, continuously receiving the broadcast program via the new broadcast service from the base station;

if the access terminal fails in receiving the broadcast program, deleting a broadcast zone identifier mapped to the broadcast program from the first broadcast zone identifier list, and transmitting the request for the physical channel information and the program information associated with the new broadcast service to the base station; and if the access terminal acquires the physical channel information associated with the new broadcast service from the base station, continuously receiving the broadcast program from the base station using the acquired physical channel information associated with the new broadcast service.

12. The method of claim 11, further comprising the steps of:

if the base station does not provide the broadcast program, inquiring of a user whether the user desires a new broadcast program;

if the new broadcast program is not selected by the user, stopping the broadcast program; and if the new broadcast program is selected by the user, acquiring physical channel information for the new broadcast program from the base station on a request basis, and receiving the new broadcast program via the new broadcast service using the acquired physical channel information for the new broadcast program.

13. The method of claim 10, further comprising wherein the step of determining whether the access terminal has departed from its previous broadcast zone comprises the steps of:

if a third broadcast zone identifier list is different from the second broadcast zone identifier list and comprises the first broadcast zone identifier list, comparing the second broadcast zone identifier list with the third broadcast zone identifier list;

if the third broadcast zone identifier list further comprises a broadcast zone identifier in addition to the second broadcast zone identifier list, determining an entry into a new broadcast zone;

if the second broadcast zone identifier list further comprises a broadcast zone identifier in addition to the third broadcast zone identifier list, determining a departure from an old non-belonging broadcast zone;

if the access terminal has entered the new broadcast zone, inquiring of the user whether the user desires a new broadcast program available in the new broadcast zone, and if the new broadcast program is selected by the user, receiving the new broadcast program from the base station; and if the access terminal has departed from the old non-belonging broadcast zone but has not entered the new broadcast zone, informing the user of the departure from the old non-belonging broadcast zone.

* * * * *

UNITED STATES PATENT AND TRADEMARK OFFICE
CERTIFICATE OF CORRECTION

PATENT NO.       : 8,248,991 B2  
APPLICATION NO.  : 11/124374  
DATED            : August 21, 2012  
INVENTOR(S)      : Yu-Chul Kim et al.

Page 1 of 1

It is certified that error appears in the above-identified patent and that said Letters Patent is hereby corrected as shown below:

On the Title Page:

Item (75) Inventor(s): should be corrected as follows:

--Dac-Gyun Kim-- to "Dae-Gyun Kim".

Signed and Sealed this
Twenty-seventh Day of November, 2012

David J. Kappos
*Director of the United States Patent and Trademark Office*